United States Patent Office 3,458,140
Patented July 29, 1969

3,458,140
PROCESS FOR CONTROLLING STREAM AND WATERWAY POLLUTION BY TREATING SEWAGE AT THE SOURCE AND APPARATUS THEREFOR
George W. Schryver, Williamstown, Mass. 01267
Filed July 25, 1966, Ser. No. 567,416
Int. Cl. B02c 11/08, 9/04; B02b 5/02
U.S. Cl. 241—23                                  6 Claims

ABSTRACT OF THE DISCLOSURE

Apparatus for treating waste material has a receptacle that houses a comminuting chamber with comminuting means, an effluent receiving chamber communicating with the latter, and a biodegrading furnace communicating with said effluent receiving chamber that sterilizes said material before it is discharged. A process breaks up the waste material, reduces it to an effluent and sterilizes it.

---

The principal object of my invention is to provide a process that utilizes the principles of the common sink electric garbage disposer, the agitator as applied to the household washing machine, and radiation. It combines with a single unit apparatus to reduce organic and other pollutants to harmless levels. The unit may be installed in each building where sewage originates, at or near the point of outfall, or in a shipping vessel.

Another object is to provide apparatus that serves as an individual treating plant for use in a house or factory.

A further object is to provide such apparatus the parts for which are readily obtainable and which may easily be assembled and set in operation.

The foregoing and other objects which will appear as the nature of the invention is better understood, may be accomplished by a construction, combination and arrangement of parts, and a process of treatment such as is disclosed by the drawings and specification. The nature of the invention is such as to render it susceptible to various changes and modifications, and, therefore, I am not to be limited to the construction disclosed by the drawings, nor to the particular parts and process steps described in the specification; but am entitled to all such changes therefrom as fall within the scope of my claims.

Figure 1:
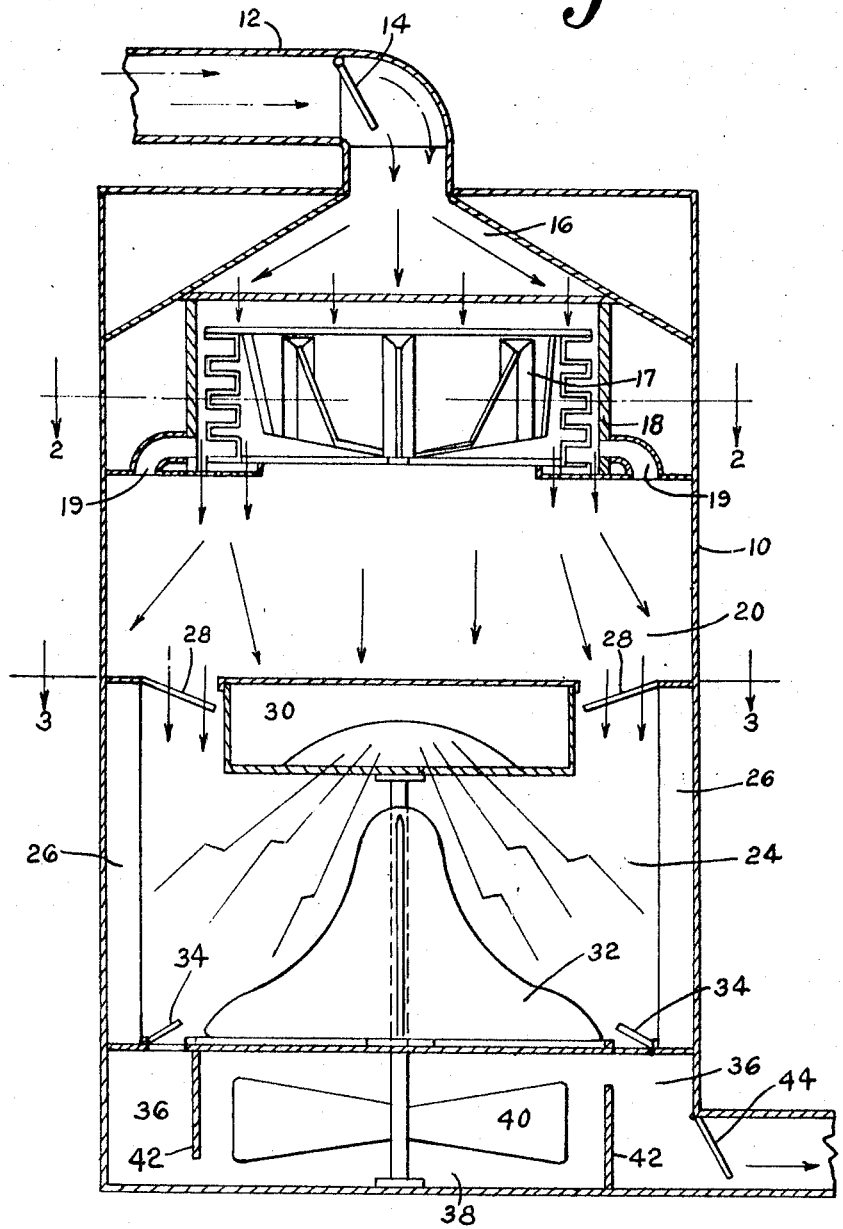
FIG. 1 is a diagrammatic view of my apparatus by which the process is performed.
Figure 2:
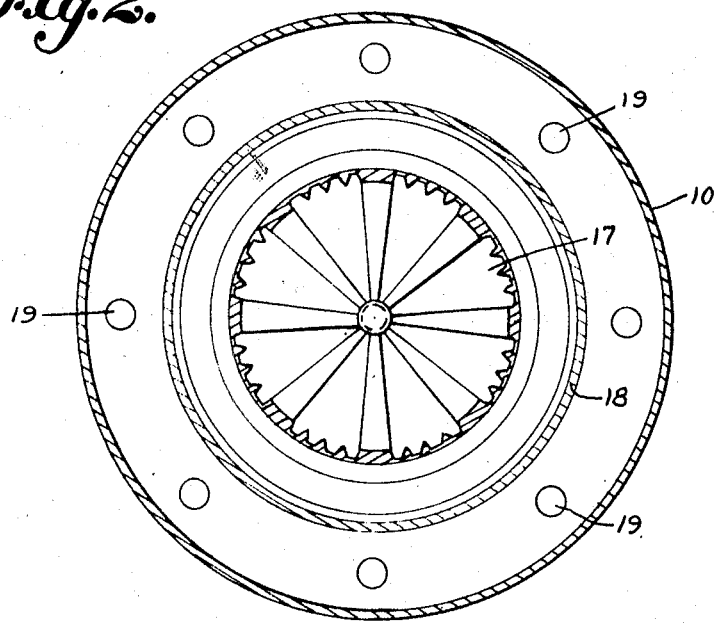
FIG. 2 is a sectional view taken on the line 2—2 of FIG. 1.
Figure 3:
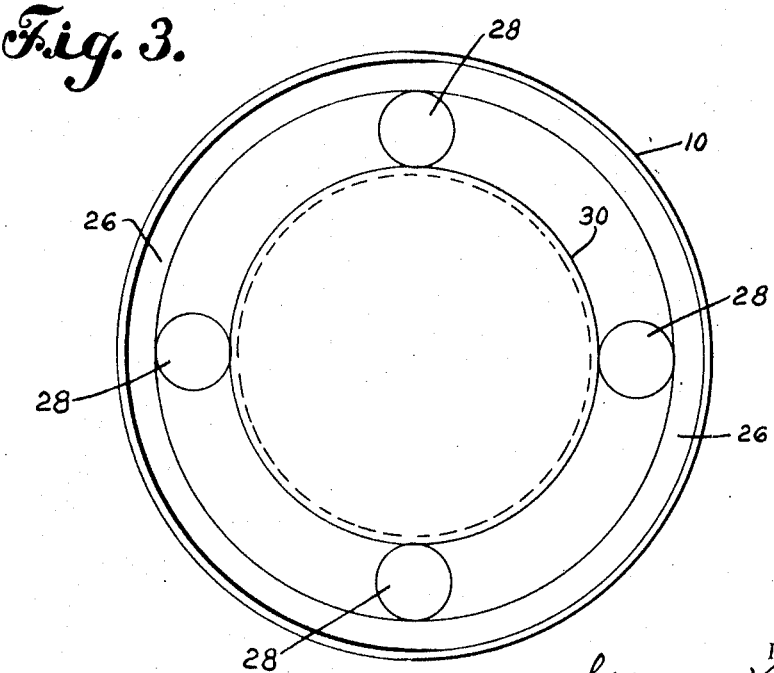
FIG. 3 is a sectional view taken on the line 3—3 of FIG. 1.

The process includes comminuting or breaking up of sewage or other waste material, at the source, then passing said material through jets to the secondary state. Thereafter the material is exposed to germ-killing rays, and finally it passes into a sanitary sewer, flowing stream or other disposal means.

In the drawings, I illustrate the use of a receptacle such as a metal tank 10 of any desired size which could be small enough for individual use in a house or relatively small building and which may be portable. Said receptacle has an inlet member 12 communicating therewith through which the sewage or waste material passes into the receptacle to be processed. A valve 14 in said inlet member 12 provides control of the flow of the material. By the word "receptacle" I include a single tank or a plurality of containers or chambers interconnected by conduits so that the communication between said containers or chambers is uninterrupted.

Within said receptacle 10 is formed a comminuting chamber 16 that receives said material to be ground or comminuted by a grinder or comminuter 17, set in a housing 18, that breaks any solid or firm parts into fine particles. The material is hereinafter referred to as effluent. All solids and non-liquid substances are reduced to minute particles. This precludes clogging and facilitates complete exposure of the effluent to radiation as it is ready to enter the secondary stage. It is then forced through jets or openings 19 communicating with said chamber and into an effluent receiving chamber 20 in said receptacle. This provides an area for equalizing the flow of said effluent.

Within said receptacle 10 is biodegrading furnace 24 that is insulated as at 26 by the use of lead or other suitable insulating material at the periphery. Check valves 28 between said effluent receiving chamber 20 and said furnace 24 serve to prevent backflow of effluent during period of exposure to radiation. Radiation equipment 30 which may use atomic material, laser tubes or the equivalent, is mounted in said furnace 24. Effluent passes by said check valves 28 into said furnace 24 where it meets an agitator 32 therein that causes a turbulence of said effluent. While in turbulence, with the comminuted sludge in suspension, the effluent is exposed to radiation emitted by said atomic material to accomplish proper degrading of the organic content and the transmutation of non-organic bodies. The sterilized effluent passes out of said furnace 24 through expulsion valves 34 to an outlet 36 to enter a stream or sewer.

Upon being sterilized, as aforesaid, said effluent material may directly pass out of said receptacle 10. However, if any radiation effect should remain that might endanger persons, or animal, plant or marine life, a cooling chamber 38 is provided in said receptacle 10 to overcome said effects. It has a well-known cooling fan 40 set in a housing 42 mounted in said receptacle 10. In this event passage is through said outlet 36 which has a check valve 44.

The apparatus may be installed in each building where sewage or other waste material of a similar nature originates, at or near the point of outfall. The mechanism may be activated in any well-known way as the effluent passes said valve 14 at the entrance to the primary treatment area. All solids and nonliquid substances are reduced to minute particles as the sewage flows through said comminuting means. This precludes clogging and facilitates complete exposure of the effluent to radiation as it enters the next stage. Chemicals and additives are not involved in this process. The effluent, treated at the source in this manner before encountering or mixing with storm water or surface wash, is practically free from heavy sludge and turbidity.

The radiation is timed according to need, and thereafter the effluent may be passed to a cooling area to remove all danger to animal, plant and marine life, whereupon it may be expelled into existing disposal systems.

Said apparatus is for production in units to serve the smallest dwelling or the largest institution or industrial plant.

It has been demonstrated that waste material from atomic power plants, although of no further use for power generation, retains a substantial amount of radiation which is useful as a bio-degrading agent in the treatment of sewage. By putting this material to work to expend its remaining potential, the costly and hazardous problem of packaging and transporting it to a proper disposal area or dumping ground will be avoided.

Treatment of sewage at the source as I have described will eliminate costly inefficient plants and the vast sewerage facilities required to transport sewage to such plants. This process will serve the isolated farm and country residence as well as the development of land and buildings that lie beyond the reach of public sewer systems.

What I claim is:

1. Apparatus to treat waste material comprising a receptacle having an inlet and an outlet, a comminuting chamber within said receptacle communicating with said inlet, comminuting means in said chamber, an effluent receiving chamber within said receptacle communicating with said comminuting chamber, and a biodegrading furnace in said receptacle communicating with said effluent receiving chamber and with said outlet.

2. Apparatus to treat waste material as set forth in claim 1, and valve means between said biodegrading furnace and said effluent receiving chamber.

3. Apparatus to treat waste material as set forth in claim 1, and a cooling chamber in said receptcle communicating with said furnace and with said outlet.

4. Apparatus to treat waste material as set forth in claim 3, and a valve controlling passage of effluent from said cooling chamber to said outlet.

5. A process of treating waste material in a receptacle having an inlet and an outlet, comminuting means and sterilizing means in said receptacle each being in a separate chamber which latter communicate with each other and with said inlet and outlet respectively and an effluent receiving chamber between and communicating with said latter two chambers, comprising supplying waste material through said inlet to said comminuting means, reducing said material to an effluent thereby, then passing it to said effluent receiving chamber to equalize the flow thereof, then passing it to said sterilizing means and sterilizing it therein, and then discharging it through said outlet.

6. A process of treating waste material as set forth in claim 5, said receptacle having a cooling chamber communicating with said sterilizing means and with said outlet, and cooling means in said chamber and cooling said sterilized effluent in said cooling chamber.

References Cited

UNITED STATES PATENTS

| | | | |
|---|---|---|---|
| 2,246,224 | 6/1941 | Streander | 210—152 |
| 2,489,454 | 11/1949 | Henno | 210—152 |
| 3,143,498 | 8/1964 | Fordyce et al. | 210—152 X |
| 3,323,650 | 6/1967 | Kilbane | 210—152 |

FRANK T. YOST, Primary Examiner

U.S. Cl. X.R.

210—1, 152; 241—25, 101